United States Patent
Hamajima et al.

(10) Patent No.: US 10,808,124 B2
(45) Date of Patent: Oct. 20, 2020

(54) GEL-FORM COMPOSITION AND WATER ABSORPTION INHIBITOR

(71) Applicant: SHIN-ETSU CHEMICAL CO., LTD., Tokyo (JP)

(72) Inventors: Yuta Hamajima, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 110 days.

(21) Appl. No.: 16/098,321

(22) PCT Filed: Apr. 25, 2017

(86) PCT No.: PCT/JP2017/016292
§ 371 (c)(1),
(2) Date: Nov. 1, 2018

(87) PCT Pub. No.: WO2017/191780
PCT Pub. Date: Nov. 9, 2017

(65) Prior Publication Data
US 2019/0177540 A1  Jun. 13, 2019

(30) Foreign Application Priority Data
May 2, 2016  (JP) ................................ 2016-092614

(51) Int. Cl.
| | | |
|---|---|---|
| C08L 83/04 | (2006.01) | |
| C08K 5/5415 | (2006.01) | |
| C09D 7/40 | (2018.01) | |
| C09D 185/00 | (2006.01) | |
| C08K 5/09 | (2006.01) | |
| C09D 183/06 | (2006.01) | |
| C04B 41/00 | (2006.01) | |
| C09K 3/18 | (2006.01) | |
| C04B 41/64 | (2006.01) | |
| C08K 5/092 | (2006.01) | |
| C04B 41/49 | (2006.01) | |
| C08K 5/098 | (2006.01) | |
| C08K 5/057 | (2006.01) | |
| C09D 143/04 | (2006.01) | |
| C09D 183/04 | (2006.01) | |

(52) U.S. Cl.
CPC ............ *C08L 83/04* (2013.01); *C04B 41/009* (2013.01); *C04B 41/4922* (2013.01); *C04B 41/64* (2013.01); *C08K 5/057* (2013.01); *C08K 5/09* (2013.01); *C08K 5/092* (2013.01); *C08K 5/098* (2013.01); *C08K 5/5415* (2013.01); *C09D 7/40* (2018.01); *C09D 143/04* (2013.01); *C09D 183/04* (2013.01); *C09D 183/06* (2013.01); *C09D 185/00* (2013.01); *C09K 3/18* (2013.01); *C08L 2205/02* (2013.01)

(58) Field of Classification Search
CPC ... C08L 83/04; C08L 2205/02; C09D 143/04; C09D 183/04
USPC ........................................................ 524/266
See application file for complete search history.

(56) References Cited

U.S. PATENT DOCUMENTS

| | | | |
|---|---|---|---|
| 4,648,904 A | 3/1987 | Depasquale et al. | |
| 5,746,810 A | 5/1998 | Suzuki | |
| 5,962,585 A | 10/1999 | Mayer et al. | |
| 2014/0356614 A1* | 12/2014 | Aoki ..................... | C09D 5/165 |
| | | | 428/306.6 |

FOREIGN PATENT DOCUMENTS

| | | |
|---|---|---|
| JP | 62-197369 A | 9/1987 |
| JP | 6-313167 A | 11/1994 |
| JP | 9-208938 A | 8/1997 |
| JP | 10-81824 A | 3/1998 |
| JP | 2004-315631 A | 11/2004 |
| JP | 2009-35704 A | 2/2009 |
| JP | 2009-155641 A | 7/2009 |
| JP | 2012-241100 A | 12/2012 |
| JP | 2014-234398 A | 12/2014 |
| JP | 2015-78305 A | 4/2015 |

OTHER PUBLICATIONS

International Search Report for PCT/JP2017/016292 dated Jun. 6, 2017.
Written Opinion of the International Searching Authority for PCT/JP2017/016292 (PCT/ISA/237) dated Jun. 6, 2017.

\* cited by examiner

*Primary Examiner* — Hui H Chin
(74) *Attorney, Agent, or Firm* — Birch, Stewart, Kolasch & Birch, LLP

(57) ABSTRACT

This gel-form composition contains (A) an organoalkoxysilane of the following formula and/or a partially hydrolyzed condensate of the organoalkoxysilane, $R^1_a Si(OR^2)_{4-a}$ ($R^1$ and $R^2$ are monovalent hydrocarbon groups, and a is 1, 2, or 3), (B) an aluminum dicarboxylate of the following formula $(R^3 COO)_2 Al(OH)$ ($R^3$ is a monovalent hydrocarbon group), (C) a C6-24 fatty acid, (D) a C6-30 dicarboxylic acid, and (E) an aluminum oligomer and/or aluminum alkoxide selected from aluminum oxide organoxides and aluminum oxide acylates. It is thereby possible to: obtain a water absorption inhibitor that imparts an excellent water absorption-inhibiting property to the surfaces of porous materials; and provide a method for imparting a water absorption-inhibiting property by applying the water absorption inhibitor to the surface of a porous material, and a porous material that is surface-treated by the water absorption inhibitor.

8 Claims, No Drawings

GEL-FORM COMPOSITION AND WATER ABSORPTION INHIBITOR

TECHNICAL FIELD

This invention relates to a gel-like composition comprising an organoalkoxysilane.

It also relates to a water absorption inhibitor obtained from the gel-like composition.

BACKGROUND ART

When inorganic porous materials suited as building materials and civil engineering structural materials are used in outdoor structures, they experience degradation by exposure to rain and absorption of water, cracking by frost damage at low temperatures or by salt injury near the seaside, and deterioration in appearance by adhesion of fungi or algae. Thus, countermeasures for extending the life span of structures are required.

Exemplary inorganic porous materials include concrete, lightweight concrete, autoclaved lightweight concrete (ALC), mortar, various cement boards, plasterboards, calcium silicate plates, bricks, roofing tiles, tiles, and stone. In one attempt to prevent deterioration of these porous materials, a substrate is coated and impregnated at its surface with a water absorption inhibitor to form a hydrophobic surface layer for preventing water and salt from penetrating into the substrate surface. Silicone-based compositions are known as the water absorption inhibitor.

Conventional silicone-based water absorption inhibitors include a solvent-type water absorption inhibitor having an alkylalkoxysilane compound diluted with an organic solvent. However, since this water absorption inhibitor has a low concentration of alkylalkoxysilane and a low viscosity, it fails to allow a sufficient amount of alkylalkoxysilane to penetrate into the substrate surface during a single coating step and also fails to form a hydrophobic layer of sufficient thickness on the substrate surface. The solvent-type water absorption inhibitor emits VOCs (volatile organic compounds) from the organic solvent during coating operation, polluting the work environment and giving rise to environmental problems. Thus, solventless water absorption inhibitors are desired in recent years.

Patent Documents 1 to 4 (JP-A S62-197369, JP-A H06-313167, JP-A H09-208938, and JP-A 2004-315631), for example, disclose an aqueous emulsion composition comprising an alkylalkoxysilane, a surfactant or emulsifier, and water, which is used as the water absorption inhibitor. However, since the surfactant is left on a substrate surface after coating, the aqueous emulsion composition fails to render the substrate surface fully hydrophobic. There are thus left the problem of degraded appearance that the substrate surface locally becomes of wet color during rainfall, and the problem that satisfactory water repellency is not available.

There is also a problem that the aqueous emulsion flows out or down when it is coated to a substrate surface thickly or to a vertical surface. Then Patent Document 5 (JP-A H10-81824) describes an aqueous cream (paste-like hydrous composition) comprising an alkylalkoxysilane, an emulsifier, and water, which is used as the water absorption inhibitor. Although this water absorption inhibitor can be thickly coated to a substrate surface because of cream form, the emulsion can be broken shortly after the coating operation, allowing the low-viscosity alkylalkoxysilane to separate out. Therefore, when the aqueous cream is coated to an inclined, vertical or down-facing surface, sag or dripping occurs, that is, the active ingredient or alkylalkoxysilane runs away before it sufficiently penetrates into the substrate surface.

Patent Document 6 (JP-A 2009-155641) describes a water absorption inhibitor obtained by dispersing an alkylalkoxysilane and cyclodextrin in water. Since cyclodextrin which is a water-soluble polymer is left on a substrate surface after coating, this water absorption inhibitor has the problems that it detracts from the substrate appearance and fails to impart sufficient water repellency.

Patent Document 7 (JP-A 2009-35704) describes a water absorption inhibitor comprising an alkylalkoxysilane and silica. This water absorption inhibitor leaves white silica on the coated surface to degrade the appearance. The residual silica must be removed with a brush or the like. When the inhibitor is coated over a large area, the operation to remove residual silica imposes a heavy burden.

Patent Document 8 (JP-A 2012-241100) discloses a water absorption inhibitor comprising an alkylalkoxysilane and a thixotropic agent. Since most thixotropic agents are commercially available as solutions in organic solvents such as xylene, mineral spirit (mineral turpentine), benzyl alcohol, ethanol, and isopropanol, the water absorption inhibitor using such a thixotropic agent inevitably contains the organic solvent. The thixotropic agent itself, that is, not dissolved in an organic solvent is powder, which is difficult to disperse in an alkylalkoxysilane.

Patent Documents 9 and 10 (JP-A 2014-234398 and JP-A 2015-78305) describe compositions comprising an organoalkoxysilane and a combination of an aluminum dicarboxylate and a $C_6$-$C_{24}$ fatty acid, the organoalkoxysilane being gelled with the combination, and a water absorption inhibitor comprising the composition. However, the gel-like compositions of Patent Documents 9 and 10 will sometimes resume liquid form during high-temperature storage. The storage stability is insufficient in the application involving outdoor storage in summer, for example, with a further improvement being demanded.

PRIOR ART DOCUMENTS

Patent Documents

Patent Document 1: JP-A S62-197369
Patent Document 2: JP-A H06-313167
Patent Document 3: JP-A H09-208938
Patent Document 4: JP-A 2004-315631
Patent Document 5: JP-A H10-81824
Patent Document 6: JP-A 2009-155641
Patent Document 7: JP-A 2009-35704
Patent Document 8: JP-A 2012-241100
Patent Document 9: JP-A 2014-234398
Patent Document 10: JP-A 2015-78305

SUMMARY OF INVENTION

Technical Problem

An object of the invention, which has been made under the above circumstances, is to provide a gel-like composition which may serve as a water absorption inhibitor capable of imparting excellent water absorption inhibitory properties to a surface of a porous material. More particularly, an object of the invention is to provide a gel-like composition comprising an organoalkoxysilane, a water absorption inhibitor comprising the composition, a method of imparting water absorption inhibitory properties by coating the water absorption inhibitor to a surface of a porous material, and a porous material which is surface treated with the water absorption inhibitor; the gel-like composition experiencing no dripping upon coating, achieving deep penetration of an active ingredient (organoalkoxysilane) into a porous material surface, imparting water absorption inhibitory properties without detracting from the appearance, and offering advantages including easy tear-off of gel, good workability in coating operation, improved storage stability, and maintenance of gel state during long-term storage at high temperature.

Solution to Problem

The inventors found in Patent Document 9 that an organoalkoxysilane is effectively gelled by a combination of an aluminum dicarboxylate and a $C_6$-$C_{24}$ fatty acid. However, the resulting gel is not easily torn off and is stretched when scooped from a container.

Making further investigations, the inventors found in Patent Document 10 that when a $C_6$-$C_{30}$ dicarboxylic acid is added to a composition containing an aluminum dicarboxylate, a fatty acid, and an organoalkoxysilane, the resulting gel is fragile and easily torn off, and easily scooped from a container in coating operation when the gel is applied to a porous material using a trowel or the like, and is improved in workability for uniform coating. However, the gel fails to maintain the gel state and partially becomes liquid during long-term storage at high temperature.

Further making extensive investigations, the inventors have found that when an aluminum oligomer selected from aluminum oxide organoxides and aluminum oxide acylates and/or an aluminum alkoxide is added to a composition comprising an aluminum dicarboxylate, a fatty acid, an organoalkoxysilane, and a $C_6$-$C_{30}$ dicarboxylic acid, there is obtained a gel-like composition which is significantly improved in storage stability of gel and maintains the gel state during long-term storage at high temperature. The invention is predicated on this finding.

Accordingly, the invention provides a gel-like composition, a water absorption inhibitor, a method of imparting water absorption inhibitory properties, and a porous material as defined below.

[1]

A gel-like composition comprising:

(A) 100 parts by weight of an organoalkoxysilane having the formula (1):

wherein $R^1$ is each independently a $C_1$-$C_{20}$ monovalent hydrocarbon group, $R^2$ is each independently a $C_1$-$C_8$ monovalent hydrocarbon group, and a is 1, 2, or 3, and/or a partial hydrolytic condensate of the organoalkoxysilane, (B) 0.3 to 20 parts by weight of an aluminum dicarboxylate having the formula (2):

$$(R^3COO)_2Al(OH) \qquad (2)$$

wherein $R^3$ is each independently a $C_1$-$C_{25}$ monovalent hydrocarbon group, (C) 0.3 to 20 parts by weight of a $C_6$-$C_{24}$ fatty acid, (D) 0.01 to 10 parts by weight of a $C_6$-$C_{30}$ dicarboxylic acid, and (E) 0.01 to 10 parts by weight of an aluminum oligomer selected from aluminum oxide organoxides and aluminum oxide acylates and/or an aluminum alkoxide.

[2]

The composition of [1], further comprising (F) a polyorganosiloxane in which the number of dimethylsiloxane units is at least 20% relative to the total number of siloxane units, in an amount of 0.1 to 50 parts by weight per 100 parts by weight of component (A).

[3]

The composition of [2] wherein component (F) is a compound having the formula (4):

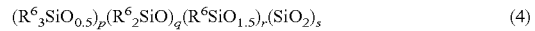

wherein $R^6$ is each independently hydrogen, hydroxyl, a substituted or unsubstituted $C_1$-$C_{10}$ monovalent hydrocarbon group which may contain an oxygen atom, or a $C_1$-$C_6$ alkoxy group, p, r, and s are integers of at least 0, q is an integer of at least 1, and the sum of p+q+r+s is such a number that the polyorganosiloxane may have a weight-average molecular weight of 500 to 5,000, with the proviso that the number of dimethylsiloxane units: $(CH_3)_2SiO$ is at least 20% relative to the total number of siloxane units represented by $R^6{}_mSiO_{(4-m)/2}$ wherein m is an integer of 0 to 3.

[4]

The composition of any one of [1] to [3], which is free of water and organic solvent.

[5]

A water absorption inhibitor comprising the composition of any one of [1] to [4].

[6]

A method of imparting water absorption inhibitory properties to a porous material, comprising coating the water absorption inhibitor of [5] to the surface of the porous material.

[7]

The method of [6] wherein the porous material is an inorganic porous material.

[8]

A porous material having a surface treated with the water absorption inhibitor of [5].

Advantageous Effects of Invention

When the gel-like composition of the invention is coated to the surface of a porous material substrate, an active ingredient (organoalkoxysilane) penetrates deeply into the substrate surface for imparting water absorption inhibitory properties (water-repellency) to the surface without detracting from the appearance. Accordingly, the gel-like composition can be advantageously used as a water absorption inhibitor. The gel-like composition may take solventless form containing neither water nor organic solvent. The solventless gel-like composition emits no VOCs (volatile organic compounds) from organic solvents during coating. Thus, the gel-like composition is particularly useful as a water absorption inhibitor for inorganic porous materials in building or civil engineering applications. In addition, the gel-like composition has excellent storage stability in that no liquid liberates from the gel during long-term storage at high temperature.

DESCRIPTION OF EMBODIMENTS

Now the invention is described in detail.

The invention provides a gel-like composition comprising:

(A) an organoalkoxysilane having the formula (1):

wherein $R^1$ is each independently a $C_1$-$C_{20}$ monovalent hydrocarbon group, $R^2$ is each independently a $C_1$-$C_8$ monovalent hydrocarbon group, and a is 1, 2, or 3, and/or a partial hydrolytic condensate of the organoalkoxysilane, (B) an aluminum dicarboxylate having the formula (2):

$$(R^3COO)_2Al(OH) \quad (2)$$

wherein $R^3$ is each independently a $C_1$-$C_{25}$ monovalent hydrocarbon group, (C) a $C_6$-$C_{24}$ fatty acid, (D) a $C_6$-$C_{30}$ dicarboxylic acid, and (E) an aluminum oligomer selected from aluminum oxide organoxides and aluminum oxide acylates and/or an aluminum alkoxide.

Component (A) is an organoalkoxysilane having the following formula (1) and/or a partial hydrolytic condensate thereof.

$$R^1_aSi(OR^2)_{4-a} \quad (1)$$

In formula (1), $R^1$ is each independently a $C_1$-$C_{20}$, preferably $C_3$-$C_{20}$, and more preferably $C_6$-$C_{10}$, monovalent hydrocarbon group which may contain an amino group, epoxy group or halogen atom. Examples of the monovalent hydrocarbon group include alkyl groups such as methyl, ethyl, propyl, isopropyl, butyl, isobutyl, tert-butyl, pentyl, isopentyl, neopentyl, hexyl, cyclohexyl, octyl, isooctyl ($C_8$ alkyl inclusive of 2,4,4-trimethylpentyl), decyl, dodecyl and norbornyl; alkenyl groups such as vinyl, allyl and hexenyl; aryl groups such as phenyl; and aralkyl groups such as styryl. The group $R^1$ may be straight, branched or cyclic. Also included are amino-containing alkyl groups such as 3-aminopropyl and N-(2-aminoethyl)-3-aminopropyl; epoxy-containing alkyl groups such as 3-glycidoxypropyl; and fluorine-containing groups such as trifluoromethyl and 3,3,3-trifluoropropyl. Inter alia, alkyl groups of at least 3 carbon atoms are preferred, with $C_6$-$C_{10}$ alkyl groups being more preferred.

$R^2$ is each independently a $C_1$-$C_8$, preferably $C_1$-$C_6$, and more preferably $C_1$-$C_4$, monovalent hydrocarbon group. Examples of the monovalent hydrocarbon group include alkyl groups such as methyl, ethyl, propyl, isopropyl, butyl, pentyl and hexyl. Inter alia, methyl and ethyl are preferred.

The subscript "a" is 1, 2, or 3, and preferably 1.

Examples of the organoalkoxysilane include trimethylmethoxysilane, trimethylethoxysilane, dimethyldimethoxysilane, dimethyldiethoxysilane, methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, hexyltrimethoxysilane, hexyltriethoxysilane, octyltrimethoxysilane, octyltriethoxysilane, isooctyltrimethoxysilane, isooctyltriethoxysilane, 2-ethylhexyltrimethoxysilane, 2-ethylhexyltriethoxysilane, decyltrimethoxysilane, decyltriethoxysilane, phenyltrimethoxysilane, phenyltriethoxysilane, vinyltrimethoxysilane, vinyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, trifluoromethyltrimethoxysilane, and 3,3,3-trifluoropropyltrimethoxysilane. Inter alia, preferred are hexyltrimethoxysilane, hexyltriethoxysilane, octyltrimethoxysilane, octyltriethoxysilane, isooctyltrimethoxysilane, isooctyltriethoxysilane, methyltriethoxysilane, butyltriethoxysilane, and propyltriethoxysilane. The organoalkoxysilanes may be used alone or in admixture of two or more.

An oligomer or polymer (referred to as partial hydrolytic condensate, hereinafter) obtained from hydrolysis of some alkoxy groups on the organoalkoxysilane and subsequent intermolecular condensation reaction may also be used as component (A). Also the organoalkoxysilane may be used in admixture with a partial hydrolytic condensate thereof. The partial hydrolytic condensate of an organoalkoxysilane may be synthesized by subjecting the organoalkoxysilane to hydrolysis and condensation reaction in the presence of an acid catalyst or alkali catalyst.

Component (B) is an aluminum dicarboxylate having the following formula (2).

$$(R^3COO)_2Al(OH) \quad (2)$$

In formula (2), $R^3$ is each independently a $C_1$-$C_{25}$, preferably $C_3$-$C_{19}$, monovalent hydrocarbon group. Particularly, examples of the monovalent hydrocarbon group include alkyl and alkenyl groups, and specifically include alkyl groups such as methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl, octadecyl and nonadecyl; and alkenyl groups corresponding to the foregoing groups which contain, in part, an unsaturated bond. The group $R^3$ may be straight, branched or cyclic. Inter alia, 1-ethylpentyl is preferred.

Examples of the aluminum dicarboxylate having formula (2) include aluminum soaps such as aluminum dioctylate, aluminum distearate, aluminum dilaurate, and aluminum dicaprate. Especially, aluminum di(2-ethylhexanoate), i.e., aluminum dioctylate corresponding to formula (2) wherein $R^3$ is 1-ethylpentyl is preferred. Herein the aluminum dicarboxylates may be used alone or in admixture of two or more.

The amount of component (B) is 0.3 to 20 parts by weight, preferably 0.5 to 10 parts by weight, and more preferably 1 to 8 parts by weight per 100 parts by weight of component (A). If the amount of component (B) is less than the lower limit, the resulting composition may not become gel-like, or even when gelled, a liquid phase may separate with the lapse of time. If the amount of component (B) exceeds the upper limit, undesirably the resulting gel is too hard and difficult to handle.

In addition to the aluminum dicarboxylate as component (B), that is, a disoap represented by the formula: $(R^3COO)_2Al(OH)$, the gel-like composition of the invention may contain an aluminum tricarboxylate, that is, a trisoap represented by the formula: $(R^3COO)_3Al$ and an aluminum monocarboxylate, that is, a monosoap represented by the formula: $(R^3COO)Al(OH)_2$, wherein $R^3$ is as defined above. In this embodiment, the content of the trisoap and monosoap is preferably up to 20 parts by weight of the trisoap and monosoap in total per 100 parts by weight of component (B).

Component (C) is a $C_6$-$C_{24}$ fatty acid, preferably $C_6$-$C_{22}$ fatty acid. If the carbon count is less than 6, the resulting composition does not become gel-like, remains liquid with a shortage of viscosity, or does not become fully gel-like as a result of liquid phase separating out. If the carbon count exceeds 24, the corresponding fatty acid has a higher melting point, which is inconvenient in that the fatty acid must be melted at high temperature upon blending. The carbon chain may have a linear, branched or cyclic structure. The fatty acid may be either saturated or unsaturated carboxylic acid.

Examples of the fatty acid include caproic acid ($C_6$), caprylic acid ($C_8$), 2-ethylhexanoic acid ($C_8$), capric acid ($C_{10}$), lauric acid ($C_{12}$), myristic acid ($C_{14}$), palmitic acid ($C_{16}$), isopalmitic acid ($C_{16}$), stearic acid ($C_{18}$), isostearic acid ($C_{18}$), oleic acid ($C_{18}$), linoleic acid ($C_{18}$), α-linolenic acid ($C_{18}$), arachidic acid ($C_{20}$), behenic acid ($C_{22}$), and lignoceric acid ($C_{24}$). The fatty acids may be used alone or in admixture of two or more.

Of these, linear fatty acids are especially preferred. More preference is given to caproic acid ($C_6$), caprylic acid ($C_8$), capric acid ($C_{10}$), lauric acid ($C_{12}$), myristic acid ($C_{14}$), palmitic acid ($C_{16}$), stearic acid ($C_{18}$), oleic acid ($C_{18}$), linoleic acid ($C_{18}$), α-linolenic acid ($C_{18}$), arachidic acid ($C_{20}$), and behenic acid ($C_{22}$).

The amount of component (C) is 0.3 to 20 parts by weight, preferably 0.5 to 10 parts by weight, and more preferably 0.5 to 8 parts by weight per 100 parts by weight of component (A). If the amount of component (C) is less than the lower limit, undesirably the resulting composition does not become gel-like, or gelation requires a high temperature of at least 60° C. or a long time. If the amount of component (C) exceeds the upper limit, undesirably the resulting gel becomes soft, or the resulting composition remains liquid, i.e., does not become gelled.

Component (D) is a $C_6$-$C_{30}$ dicarboxylic acid and preferably $C_{10}$-$C_{24}$ dicarboxylic acid. If the carbon count is less than the lower limit, the resulting composition does not become satisfactorily gelled. That is, the composition remains liquid, with shortage of viscosity, the composition does not become satisfactorily gelled as a result of liquid phase separating out, or the dicarboxylic acid is left undissolved in the gel-like composition. If the carbon count exceeds the upper limit, the dicarboxylic acid has a higher melting point, which is inconvenient in that the acid must be melted at high temperature upon blending. The carbon chain may have a linear, branched or cyclic structure. The dicarboxylic acid may be either aliphatic or aromatic dicarboxylic acid, with the aliphatic dicarboxylic acid being preferred. The aliphatic dicarboxylic acid may be a saturated aliphatic dicarboxylic acid or an aliphatic dicarboxylic acid having an unsaturated bond. The dicarboxylic acids may be used alone or in admixture of two or more.

Examples of the aliphatic dicarboxylic acid include adipic acid ($C_6$), pimelic acid ($C_7$), suberic acid ($C_8$), azelaic acid ($C_9$), sebacic acid ($C_{10}$), dodecanedioic acid ($C_{12}$), tetradecanedioic acid ($C_{14}$), hexadecanedioic acid ($C_{16}$), eicosanedioic acid ($C_{20}$), 8,13-dimethyleicosanedioic acid ($C_{22}$) and 8,13-dimethyl-8,12-eicosadienedioic acid ($C_{22}$). Examples of the aromatic dicarboxylic acid include phthalic acid ($C_8$), isophthalic acid ($C_8$) and terephthalic acid ($C_8$).

The dicarboxylic acid used herein encompasses a dicarboxylic acid having a polyorganosiloxane chain as represented by the following formula.

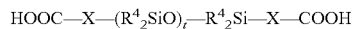

In the formula, t is an integer of at least 0. The value of t is such that the polyorganosiloxane-containing dicarboxylic acid may have a weight-average molecular weight of up to 5,000, and preferably from 200 to 3,000. If the weight-average molecular weight exceeds the upper limit, the water absorption inhibitor may become less penetrative to a substrate, or the substrate surface may be colored to wet color. As used herein, the weight-average molecular weight is as measured by gel permeation chromatography (GPC) versus polystyrene standards (the same holds true, hereinafter).

In the formula, X is a $C_1$-$C_{10}$ divalent alkylene group, examples of which include methylene, ethylene and propylene.

In the formula, $R^4$ is each independently hydrogen or a substituted or unsubstituted $C_1$-$C_{10}$, preferably $C_1$-$C_8$, monovalent hydrocarbon group which may contain an oxygen or nitrogen atom. Examples of the monovalent hydrocarbon group include alkyl groups such as methyl, ethyl, propyl, isopropyl, butyl, isobutyl, tert-butyl, hexyl, cyclohexyl, octyl and decyl; alkenyl groups such as vinyl, allyl and isopropenyl; aryl groups such as phenyl, xylyl and tolyl; aralkyl groups such as benzyl, phenylethyl and phenylpropyl; and halo-substituted monovalent hydrocarbon groups in which some or all hydrogen atoms are substituted by halogen atoms (e.g., chlorine, fluorine or bromine), such as chloromethyl, bromoethyl and trifluoropropyl. Also included are alkyl groups in which at least one hydrogen atom is substituted by a polyether, amino, epoxy or carboxyl moiety, or an organic moiety containing any of the foregoing.

The dicarboxylic acid used herein may be any of commercially available products. Examples of the commercial dicarboxylic acid include those manufactured by Okamura Oil Mill, Ltd. Examples include linear dibasic acids such as SL-12 ($C_{12}$) and SL-20 ($C_{20}$), branched dibasic acids such as IPU-22 ($C_{22}$), IPS-22 ($C_{22}$), and SB-20 (a mixture of acids of 12 to 22 carbon atoms), and a mixture of a linear dibasic acid and a branched dibasic acid, such as ULB-20 ($C_{20}$).

The amount of component (D) is 0.01 to 10 parts by weight, preferably 0.02 to 5 parts by weight, and more preferably 0.03 to 3 parts by weight per 100 parts by weight of component (A). If the amount of component (D) is less than the lower limit, the resulting gel-like composition becomes too hard to tear off and difficult to be scooped by a spatula or trowel. In addition, the coating operation of spreading the gel-like composition thinly and uniformly on a substrate surface encounters difficulty, resulting in uneven coating. If the amount of component (D) exceeds the upper limit, undesirably the composition requires a high temperature of at least 60° C. or a long time for gelation, and the resulting gel-like composition returns to liquid with the lapse of time.

Component (E) is an aluminum oligomer selected from aluminum oxide organoxides and aluminum oxide acylates and/or an aluminum alkoxide.

Examples of the aluminum alkoxide include aluminum trialkoxides having $C_1$-$C_{24}$ alkoxyl, such as aluminum trimethoxide, aluminum triethoxide, aluminum tri-n-propoxide, aluminum triisopropoxide, aluminum tri-n-butoxide, aluminum tri-sec-butoxide, aluminum triisobutoxide, aluminum trihexyloxide, aluminum tri(2-ethylhexyloxide), aluminum butoxydiisopropoxide, aluminum dibutoxyisopropoxide, aluminum diisopropoxy-2-ethylhexyloxide, and aluminum trioctyloxide. The aluminum alkoxides may be used alone or in admixture of two or more.

Typical of the aluminum oligomer is a linear or cyclic compound having a structure represented by the following formula (3). The aluminum oligomer which is a linear compound is terminated with $OR^5$.

[Chem. 1]

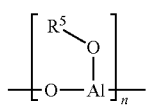

(3)

Herein $R^5$ which may be the same or different is a substituted or unsubstituted $C_1$-$C_{24}$ alkyl, alkenyl, aryl, cycloalkyl, heterocyclic or acyl group, n is an integer of 2 to 10, preferably an integer of 2 to 6, and more preferably an integer of 2 to 4.

In formula (3), examples of the alkyl group represented by $R^5$ include those of 1 to 24 carbon atoms such as methyl, ethyl, propyl, butyl, sec-butyl, tert-butyl, pentyl, hexyl, heptyl, octyl, nonyl, decyl, undecyl, dodecyl, tridecyl, tetradecyl, pentadecyl, hexadecyl, to heptadecyl, octadecyl, nonadecyl, icosyl, heneicosyl, and docosyl.

Examples of the alkenyl group include those of 2 to 24 carbon atoms such as vinyl, allyl, butenyl, pentenyl, and hexenyl.

Examples of the aryl group include those of 6 to 24 carbon atoms such as phenyl, tolyl, 4-cyanophenyl, biphenyl, o-, m- or p-terphenyl, naphthyl, anthranyl, phenanthrenyl, fluorenyl, 9-phenylanthranyl, 9,10-diphenylanthranyl, and pyrenyl.

Examples of the cycloalkyl group include those of 3 to 24 carbon atoms such as cyclopentyl, cyclohexyl, norbornane, adamantane, 4-methylcyclohexyl, and 4-cyanocyclohexyl.

Examples of the heterocyclic group include those of 3 to 24 carbon atoms such as pyrrole, pyrroline, pyrazole, pyrazoline, imidazole, triazole, pyridine, pyridazine, pyrimidine, pyrazine, triazine, indole, benzimidazole, purine, quinoline, isoquinoline, cinnoline, quinoxaline, benzoquinoline, fluorenone, dicyanofluorenone, carbazole, oxazole, oxadiazole, thiazole, thiadiazole, benzoxazole, benzothiazole, benzotriazole, bisbenzoxazole, bisbenzothiazole, and bisbenzimidazole.

Examples of the acyl group include those of 2 to 24 carbon atoms such as formyl, acetyl, propionyl, butyryl, isobutyryl, valeryl, isovaleryl, pivaloyl, lauroyl, myristoyl, palmitoyl, stearoyl, oxalyl, malonyl, succinyl, glutaryl, adipoyl, pimeloyl, suberoyl, azelaoyl, sebacoyl, acryloyl, propioloyl, methacryloyl, crotonoyl, isocrotonoyl, oleoyl, elaidoyl, maleoyl, fumaroyl, citraconoyl, mesaconoyl, camphoroyl, benzoyl, phthaloyl, isophthaloyl, terephthaloyl, naphthoyl, toluoyl, hydroatropoyl, atropoyl, cinnamoyl, furoyl, thenoyl, nicotinoyl, isonicotinoyl, glycoloyl, lactoyl, glyceroyl, tartronoyl, maloyl, tartaroyl, tropoyl, benziloyl, salicyloyl, anisoyl, vanilloyl, veratroyl, piperonyloyl, protocatechuoyl, galloyl, glyoxyloyl, pyruvoyl, acetoacetyl, mesoxalyl, mesoxalo, oxalacetyl, oxalaceto, and levulinoyl. Some or all hydrogen atoms of the foregoing acyl groups may be substituted by fluorine, chlorine, bromine or iodine.

The aluminum oligomer used herein is typically a cyclic condensate of aluminum trialkoxide (cyclic aluminum oligomer), which may be prepared by the preparation methods described in, for example, INDUSTRIAL AND ENGINEERING CHEMISTRY, Vol. 56, No. 5, pp 42-50, 1964 and U.S. Pat. No. 2,979,497 (1961).

Examples of the cyclic aluminum oligomer include aluminum oxide organoxides which are cyclic trimers prepared by adding water to an aluminum triorganoxide, typically an aluminum trialkoxide having $C_1$-$C_{24}$ alkoxyl, such as aluminum trimethoxide, aluminum triethoxide, aluminum tri-n-propoxide, aluminum triisopropoxide, aluminum tri-n-butoxide, aluminum tri-sec-butoxide, aluminum triisobutoxide, aluminum trihexyloxide, aluminum tri(2-ethylhexyloxide), aluminum butoxydiisopropoxide, aluminum dibutoxyisopropoxide, aluminum diisopropoxy-2-ethylhexyloxide, and aluminum trioctyloxide, reacting them in a hydrocarbon or alcohol solvent with vigorous stirring, and distilling off the alcohol formed and the solvent used; and aluminum oxide acylate cyclic oligomers obtained by reacting the aluminum oxide organoxides with monobasic organic acids to substitute an acyl group originating from the monobasic organic acid for the alkoxyl group.

Examples of the monobasic organic acid used in the preparation of the aluminum oxide acylate cyclic oligomers include, but are not limited to, n-octylic acid, 2-ethylhexanoic acid, lauric acid, myristic acid, stearic acid, behenic acid, undecylenic acid, oleic acid, linoleic acid, linolenic acid, and mixtures thereof.

Of the aluminum oligomers, preference is given to aluminum oxide 2-ethylhexanoate, aluminum oxide isopropylate, aluminum oxide stearate, aluminum oxide octylate, aluminum butoxydiisopropoxide, and aluminum oxide laurate. Among others, aluminum oligomers having the structure of formula (3) wherein n ranges from 2 to 6, especially from 2 to 4, in which the oligomer of n=3 is a main component are preferred.

The aluminum oligomers may be used alone or in admixture of two or more.

Commercially available products may be used as the aluminum oligomer and aluminum alkoxide. Suitable aluminum oligomers and aluminum alkoxides are commercially available from Hope Chemical Co., Ltd. Examples include liquid OLIPE AOO (aluminum oxide octylate) and liquid OLIPE AOS-SAF (aluminum oxide stearate).

The amount of component (E) is 0.01 to 10 parts by weight, preferably 0.05 to 5 parts by weight, more preferably 0.1 to 3 parts by weight per 100 parts by weight of component (A). If the amount of component (E) is less than the lower limit, storage stability is insufficient and a part or all of the gel becomes liquid during storage at high temperature. An amount of component (E) in excess of the upper limit is not preferred because the resulting gel is too hard and difficult to handle.

In addition to components (A) to (E), the gel-like composition may further contain (F) a polyorganosiloxane in which the number of dimethylsiloxane units is at least 20%, preferably at least 40% relative to the total number of siloxane units. Component (F) functions to improve the water-repellency of the gel-like composition.

Typical of the polyorganosiloxane is a compound having the following formula (4).

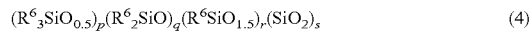

$$(R^6{}_3SiO_{0.5})_p(R^6{}_2SiO)_q(R^6SiO_{1.5})_r(SiO_2)_s \quad (4)$$

In formula (4), p, r and s each are an integer of at least 0, preferably p is an integer of 1 to 10, r is an integer of 0 to 10, and s is an integer of 0 to 10; q is an integer of at least 1, preferably an integer of 10 to 1,000, and more preferably an integer of 20 to 300. The sum of p+q+r+s is such a number that the polyorganosiloxane may have a weight-average molecular weight of from 500 to 5,000, preferably from 1,000 to 3,000. If the weight-average molecular weight exceeds the upper limit, the impregnation of a substrate with the water absorption inhibitor may be retarded or the substrate surface may be colored to wet color. The polyorganosiloxanes may be used alone or in admixture of two or more.

In formula (4), $R^6$ is each independently hydrogen, hydroxyl, a substituted or unsubstituted $C_1$-$C_{10}$, preferably $C_1$-$C_8$, monovalent hydrocarbon group which may contain an oxygen atom, or a $C_1$-$C_6$ alkoxy group. Examples of the monovalent hydrocarbon group include alkyl groups such as methyl, ethyl, propyl, isopropyl, butyl, isobutyl, tert-butyl, hexyl, cyclohexyl, octyl, and decyl; alkenyl groups such as vinyl, allyl, and isopropenyl; aryl groups such as phenyl, tolyl, and xylyl; aralkyl groups such as benzyl, phenylethyl, and phenylpropyl; and halo-substituted monovalent hydrocarbon groups corresponding to the foregoing hydrocarbon groups in which some or all hydrogen atoms are substituted by halogen atoms (e.g., chlorine, fluorine and bromine), such as chloromethyl, bromoethyl and trifluoropropyl. Also included are alkyl groups in which at least one hydrogen atom is substituted by a polyether, amino, epoxy or carboxyl moiety, or an organic moiety containing such a moiety. Exemplary alkoxy groups include methoxy, ethoxy, isopropoxy, butoxy, and isobutoxy.

In the compound of formula (4), some of the groups represented by $R^6$ may be $C_1$-$C_6$ alkoxy, hydroxyl or hydrogen. In particular, the polyorganosiloxane preferably contains a silicon-bonded alkoxy or hydroxyl group. In formula (4), methyl groups preferably account for at least 40% of the total number of the groups represented by $R^6$.

In the polyorganosiloxane of formula (4), the number of dimethylsiloxane units: $(CH_3)_2SiO$ is at least 20%, preferably at least 40% relative to the total number of siloxane units: $R^6_m SiO_{(4-m)/2}$ wherein m is an integer of 0 to 3.

As described above, the polyorganosiloxane of formula (4) may contain siloxane units having a silicon-bonded hydroxyl or alkoxy group in the molecule. Examples of the siloxane unit having a hydroxyl or alkoxy group include $(R^7O)R^8_2SiO_{0.5}$ units, $(R^7O)R^8SiO$ units, and $(R^7O)SiO_{1.5}$ units. Examples of the siloxane unit free of a hydroxyl or alkoxy group include $R^8_3SiO_{0.5}$ units, $R^8_2SiO$ units, $R^8SiO_{1.5}$ units, and $SiO_2$ units. Herein $R^7$ is hydrogen or a $C_1$-$C_6$ alkyl group such as methyl, ethyl, isopropyl, butyl or isobutyl, and $R^8$ is hydrogen, or a substituted or unsubstituted $C_1$-$C_{10}$, preferably $C_1$-$C_8$, monovalent hydrocarbon group. When the polyorganosiloxane contains hydroxyl or alkoxy groups, the content of these groups is preferably up to 10% by weight, more preferably up to 7% by weight relative to the weight of the polyorganosiloxane. The lower limit of the hydroxyl or alkoxy content is not critical. A hydroxyl or alkoxy content in excess of the upper limit is not preferred because of a reduced percent gelation.

When component (F) is added, the amount of component (F) blended is preferably in the range of 0.1 to 50 parts by weight, more preferably 0.5 to 30 parts by weight per 100 parts by weight of component (A). If the amount of component (F) exceeds the upper limit, the impregnation of a substrate with the resulting water absorption inhibitor may be retarded, or the substrate surface may be colored to wet color.

The gel-like composition of the invention may further contain other additives. Suitable additives used herein include well-known additives for use in water absorption inhibitors, for example, antifungal agents, antialgal agents, ultraviolet absorbers, antioxidants, pigments, dyes, thickeners, solvents, waxes, and metal soaps other than the above-mentioned aluminum soaps. Furthermore, inorganic fillers such as silica, alumina, titania, mica, and talc, and inorganic thickeners such as montmorillonite and bentonite may also be blended. The amounts of additives blended may be suitably adjusted according to conventional methods as long as the objects of the invention are not compromised.

To the gel-like composition, hydrocarbon compounds or paraffins may be added for the purpose of adjusting gel strength. It is noted that although the addition of compounds having a higher boiling point or flash point than the organoalkoxysilane is preferred, the addition of solvents having a lower boiling point or flash point than the organoalkoxysilane is unfavorable.

However, the gel-like composition is preferably of solventless form free of water and organic solvents. The solventless gel-like composition does not release VOCs (volatile organic compounds) from organic solvents during coating operation.

The gel-like composition of the invention may be prepared by mixing the above-described components and is available in gel state. The mixing method and apparatus used are not particularly limited and may accord with any prior art well-known methods. Use may be made of, for example, mixers equipped with paddle or propeller type mixing blades, mixers used in batch mixing devices, such as an anchor mixer, disper mixer, planetary mixer, and kneader, and mixers used in continuous mixing devices, such as a static mixer, line mixer, and colloid mill. The term "gel" generally refers to a disperse system having a high viscosity and devoid of fluidity. The gel obtained from the gel-like composition is especially in jelly form.

The mixing temperature during the preparation may range from −10° C. to the boiling point of an organoalkoxysilane used although it is not particularly limited. Typically the temperature may be 0 to 80° C., especially 10 to 70° C. If necessary, gelation may be accelerated by heating at 30 to 70° C.

The gel-like composition of the invention may be used as a water absorption inhibitor. The water absorption inhibitor is coated to a surface of a porous material substrate to impart water absorption inhibitory properties to the substrate surface. Examples of the substrate to be coated with the water absorption inhibitor include inorganic porous materials such as concrete, lightweight concrete, autoclaved lightweight concrete (ALC), mortar, various cement boards, plasterboards, calcium silicate plates, bricks, roofing tiles, tiles, and stone. The gel-like composition may also be coated to walls based on diatomaceous earth, clay, plaster or the like, and organic porous materials such as paper, wood and leather.

The coating weight of the water absorption inhibitor on a substrate may be typically 5 to 1,000 g/m², preferably 10 to 300 g/m² although it is not particularly limited. A coating weight of less than 5 g/m² may fail to exert sufficient water absorption inhibitory properties. Even if the coating weight exceeds 1,000 g/m², the depth of impregnation may not increase beyond a certain level, and the drying may take an unnecessarily long time.

The method of coating the water absorption inhibitor to a substrate is not particularly limited and may accord with prior art well-known methods. For example, a brush, roller, spatula, trowel, spraying and blowing may be used. A predetermined amount of the inhibitor may generally be coated at a time although it may be coated in plural layers if necessary. Drying after coating may be carried out by holding at normal temperature or by heating at about 40 to 80° C.

The inventors presume the gelling mechanism of the inventive composition as follows. For example, when aluminum di(2-ethylhexanoate) is added to any of organic solvents having low polarity, the aluminum di(2-ethylhexanoate) forms high-molecular-weight linear aggregates in the organic solvent, the aggregates are mutually entangled, and the organic solvent is captured in voids among the aggregates to form a gel. Similarly, the gel-like composition of the invention is believed to follow the mechanism that the aluminum dicarboxylate forms aggregates in an organoalkoxysilane and/or a partial hydrolytic condensate thereof (collectively referred to as "organoalkoxysilane," hereinafter), and the organoalkoxysilane is captured in voids among the aggregates. The fatty acid is believed to promote dissolution of long-chain aggregates formed from the aluminum dicarboxylate in the organoalkoxysilane. The dicarboxylic acid is believed to form partial crosslinks between the long-chain aggregates. This means that stretching of the gel under tensile forces is suppressed, and the gel becomes fragile enough to be torn off. Thus, the composition is easily scooped from a container, and easily broken and coated thinly and uniformly in coating operation. By contrast, the gel free from dicarboxylic acid is unbreakable, stretchable under tensile forces, and difficult to handle. The inventive composition is effectively gelled by blending a combination of an aluminum dicarboxylate and a fatty acid in an organoalkoxysilane. In the gel-like composition of the invention, the organoalkoxysilane is not gelled if either one of the aluminum dicarboxylate and the fatty acid is omitted.

When the gel-like composition of the invention is coated onto a porous material substrate, the organoalkoxysilane is absorbed and penetrated into pores deeply below the substrate surface while maintaining the gel state. Thus, the gel-like composition experiences no dripping (or sag) in coating operation and imparts excellent water absorption inhibitory properties (water-repellency) to the porous surface. Since the aluminum dicarboxylate has low polarity and no affinity to water, it is not dissolved or dispersed at all in water. Also, since the fatty acid has similarly low polarity, it is sparingly dissolved or not dissolved in water. Accordingly, no water-affinity components are left on the substrate surface after the impregnation of the substrate with the organoalkoxysilane, indicating that excellent water absorption inhibitory properties (water-repellency) are available.

On the basis of the inventors' presumption that water causes a change of the gel-like composition into liquid during long-term storage at high temperature, component (E) is added as a water-capturing agent. The function mechanism of component (E) is as follows.

It is assumed that component (E) is, for example, a trimolecular cyclic compound of aluminum trialkoxide as shown by the formula (5).

[Chem. 2]

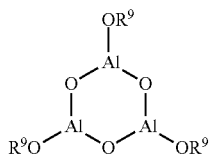

(5)

Herein $R^9$ is a $C_1$-$C_{24}$ alkyl group, examples of which are as exemplified above for $R^5$.

It is supposed that the compound of formula (5) reacts with water molecules as shown in the following formula (6) to capture water in the composition.

[Chem. 3]

(6)

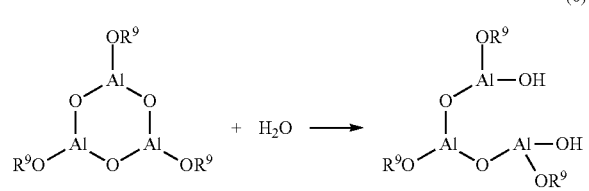

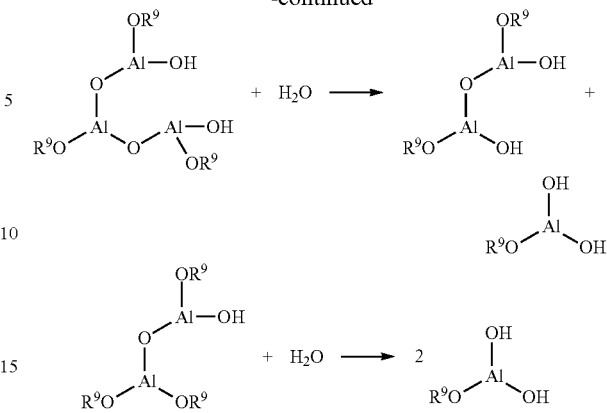

Herein $R^9$ is as defined above.

It is understood from formula (6) that component (E) captures water in the gel to prevent the gel-like composition from liquefying, leading to an improvement in storage stability.

EXAMPLES

Examples and Comparative Examples are given below for further illustrating the invention although the invention is not limited to these Examples.

Example 1

On a planetary mixer, 90 parts by weight of octyltriethoxysilane, 2.5 parts by weight of OCTOPE AL-T (aluminum di(2-ethylhexanoate) represented by $(CH_3(CH_2)_3CH(C_2H_5)COO)_2Al(OH)$, by Hope Chemical Co., Ltd.), 1.0 part by weight of oleic acid, 0.05 part by weight of a dicarboxylic acid (IPU-22, branched dibasic acid of 22 carbon atoms, by Okamura Oil Mill, Ltd.), and 1.0 part by weight of liquid OLIPE AOO (aluminum oxide octylate, i.e., solution of 48 wt % aluminum oxide octylate in naphtha, by Hope Chemical Co., Ltd.) were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Example 2

On a planetary mixer, 90 parts by weight of octyltriethoxysilane, 2.5 parts by weight of OCTOPE AL-T, 1.0 part by weight of oleic acid, 0.05 part by weight of dicarboxylic acid (IPU-22), and 1.0 part by weight of liquid OLIPE AOS-SAF (aluminum oxide stearate, i.e., solution of 36 wt % aluminum oxide stearate in naphtha, by Hope Chemical Co., Ltd.) were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Example 3

On a planetary mixer, 90 parts by weight of octyltriethoxysilane, 2.5 parts by weight of OCTOPE AL-T, 1.0 part by weight of oleic acid, 0.05 part by weight of dicarboxylic acid (IPU-22), and 0.5 part by weight of liquid OLIPE AOO were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Example 4

On a planetary mixer, 90 parts by weight of octyltriethoxysilane, 10 parts by weight of polydimethylsiloxane having the formula (7):

$(CH_3)_2(HO)SiO[(CH_3)_2SiO]_{10}Si(CH_3)_2(OH)$     (7), 2.5 parts by weight of OCTOPE AL-T, 1.0 part by weight of oleic acid, 0.05 part by weight of dicarboxylic acid (IPU-22), and 1.0 part by weight of liquid OLIPE AOO were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Example 5

On a planetary mixer, 90 parts by weight of octyltriethoxysilane, 10 parts by weight of polydimethylsiloxane represented by the above formula (7), 2.5 parts by weight of OCTOPE AL-T, 1.0 part by weight of oleic acid, 0.05 part by weight of dicarboxylic acid (IPU-22), and 0.5 part by weight of liquid OLIPE AOO were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Comparative Example 1

On a planetary mixer, 90 parts by weight of octyltriethoxysilane, 2.5 parts by weight of OCTOPE AL-T, and 1.0 part by weight of oleic acid were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Comparative Example 2

On a planetary mixer, 90 parts by weight of octyltriethoxysilane, 2.5 parts by weight of OCTOPE AL-T, 1.0 part by weight of oleic acid, and 0.05 part by weight of dicarboxylic acid (IPU-22) were mixed at 50° C. for about 4 hours to form a colorless transparent gel-like composition. The gel-like composition, 50 g, was placed in a container of 100 mL volume, after which the container was turned upside down, finding that the gel-like composition did not flow out.

Comparative Example 3

On a planetary mixer, 90 parts by weight of octyltriethoxysilane, 10 parts by weight of polydimethylsiloxane represented by the above formula (7), 2.5 parts by weight of OCTOPE AL-T, 1.0 part by weight of oleic acid, and 0.05 part by weight of dicarboxylic acid (IPU-22) were mixed at 50° C. for about 4 hours to form a colorless transparent gel-like composition. The gel-like composition, 50 g, was placed in a container of 100 mL volume, after which the container was turned upside down, finding that the gel-like composition did not flow out.

The gel-like compositions obtained in Examples 1 to 5 and Comparative Examples 1 to 3 were evaluated by the methods described below for properties including dripping, appearance, water repellency, depth of impregnation, tear-off, coatability, and storage stability. The results are shown in Table.

(1) Dripping

A mortar piece (length 70 mm, width 70 mm, and height 25 mm) was prepared according to JIS R5201 and used as a test piece. On the surface of the test piece of length 70 mm by width 70 mm, each gel-like composition was placed in a coating weight of 200 g/m$^2$ and spread as evenly as possible using a spatula. Immediately after coating, the test piece was statically held so that the coated surface was vertical. The test piece was visually observed to see whether or not the coated gel-like composition run down.

(2) Appearance

A mortar test piece was coated with each gel-like composition as in test (1). The test piece was allowed to stand at 25° C. and 50% RH for 7 days for curing. Thereafter, a proportion of wet color-retaining spots on the surface coated with the gel-like composition was determined by visual observation and evaluated according to the following criteria.

5: The area of wet color-retaining spots is up to 5% of the total area of the coated surface (i.e., having an appearance equivalent to that of a test piece which is not coated with the gel-like composition).
4: The area of wet color-retaining spots is from more than 5% to less than 25% of the total area of the coated surface.
3: The area of wet color-retaining spots is from 25% to less than 75% of the total area of the coated surface.
2: The area of wet color-retaining spots is from 75% to less than 95% of the total area of the coated surface.
1: The area of wet color-retaining spots is at least 95% of the total area of the coated surface.

(3) Water Repellency

A mortar test piece was coated with each gel-like composition as in test (1). The test piece was allowed to stand at 25° C. and 50% RH for 7 days for curing. To the surface coated with the gel-like composition, running water was applied through a shower for 5 minutes. Thereafter, the surface coated with the gel-like composition was determined for water repellency and a proportion of wet color spots by visual observation, and evaluated according to the following criteria.

Repellency

5: The water-repellent area is at least 95% of the total area of the coated surface.
4: The water-repelling area is from 75% to less than 95% of the total area of the coated surface.
3: The water-repellent area is from 25% to less than 75% of the total area of the coated surface.
2: The water-repellent area is from 5% to less than 25% of the total area of the coated surface.

1: The water-repellent area is less than 5% of the total area of the coated surface.

Wet Color

5: The area of wet color-retaining spots is up to 5% of the total area of the coated surface.
4: The area of wet color-retaining spots is from more than 5% to less than 25% of the total area of the coated surface.
3: The area of wet color-retaining spots is from 25% to less than 75% of the total area of the coated surface.
2: The area of wet color-retaining spots is from 75% to less than 95% of the total area of the coated surface.
1: The area of wet color-retaining spots is at least 95% of the total area of the coated surface.

(4) Depth of Impregnation

A mortar test piece was coated with each gel-like composition as in test (1). The test piece was allowed to stand at 25° C. and 50% RH for 7 days for curing. The test piece was vertically split so as to divide the gel-like composition-coated surface into two.

Water was sprayed to the split section. The depth of a portion which did not absorb water and was not colored to wet color was measured and reported as depth of impregnation.

(5) Tear-Off and Coatability

Each gel-like composition was evaluated by scooping it from the container with a spatula. The gel-like composition was rated good when the scooped portion torn from the remaining composition and stayed on the spatula tip, or poor when the scooped portion stretched, did not tear from the remaining composition, and did not stay on the spatula tip. Each gel-like composition was also evaluated by coating it to a mortar test piece with a spatula as in test (1). The gel-like composition was rated good when the composition was uniformly coated to a predetermined thickness, or poor when parts of the composition agglomerated to make the coating uneven.

(6) Storage Stability (25° C./2 Months)

A container of 100 mL volume was charged with 50 g of the gel-like composition, tightly closed, and held in a thermostatic chamber at 25° C. for 2 months. After storage, the gel-like composition was rated good when the composition kept the same gel state as 2 months before, or poor when the gel liquefied partly or entirely.

(7) Storage Stability (40° C./2 Months)

A container of 100 mL volume was charged with 50 g of the gel-like composition, tightly closed, and held in a thermostatic chamber at 40° C. for 2 months. After storage, the gel-like composition was rated good when the composition kept the same gel state as 2 months before, or poor when the gel liquefied partly or entirely.

TABLE 1

|  |  | Example | | | | | Comparative Example | | |
| --- | --- | --- | --- | --- | --- | --- | --- | --- | --- |
|  |  | 1 | 2 | 3 | 4 | 5 | 1 | 2 | 3 |
| Component A | Octyltriethoxysilane | 90 | 90 | 90 | 90 | 90 | 90 | 90 | 90 |
| Component B | OCTOPE AL-T | 2.5 | 2.5 | 2.5 | 2.5 | 2.5 | 2.5 | 2.5 | 2.5 |
| Component C | Oleic acid | 1.0 | 1.0 | 1.0 | 1.0 | 1.0 | 1.0 | 1.0 | 1.0 |
| Component D | Dicarboxylic acid (IPU-22) | 0.05 | 0.05 | 0.05 | 0.05 | 0.05 |  | 0.05 | 0.05 |
| Component E | Aluminum oxide octylate | 1.0 |  | 0.5 | 1.0 | 0.5 |  |  |  |
|  | Aluminum oxide stearate |  | 1.0 |  |  |  |  |  |  |
| Component F | Polydimethylsiloxane |  |  |  | 10 | 10 |  |  | 10 |
| Evaluation | Dripping | None | None | None | None | None | None | None | None |
|  | Appearance | 5 | 5 | 5 | 5 | 5 | 5 | 5 | 5 |
|  | Water-repellency, Repellency | 5 | 5 | 5 | 5 | 5 | 5 | 5 | 5 |
|  | Water-repellency, Wet color | 5 | 5 | 5 | 5 | 5 | 5 | 5 | 5 |
|  | Depth of impregnation (mm) | 7.3 | 7.2 | 7.8 | 7.8 | 7.2 | 7.6 | 7.7 | 7.6 |
|  | Tear-off | Good | Good | Good | Good | Good | Poor | Good | Good |
|  | Coatability | Good | Good | Good | Good | Good | Poor | Good | Good |
|  | Storage stability (25° C./2 months) | Good | Good | Good | Good | Good | Good | Good | Good |
|  | Storage stability (40° C./2 months) | Good | Good | Good | Good | Good | Poor | Poor | Poor |

As shown in Table 1, a gel obtained from a gel-like composition of the invention is fragile, and has good tear-off and coatability. Thus, the gel-like composition of the invention offers good workability in coating operation. In addition, the gel-like composition maintains the gel state even during long-term storage at high temperature, indicating excellent storage stability. The gel-like composition does not undergo dripping or sag even when coated to a vertical surface, does not detract from the appearance, penetrates deeply into the surface of a porous material, and imparts excellent water absorption inhibitory properties (water-repellency) to the porous material surface.

In contrast, the gel-like compositions of Comparative Examples which are free of component (E) as defined herein are insufficient in storage stability because the gel liquefies partly or entirely during long-term storage at high temperature.

INDUSTRIAL APPLICABILITY

The water absorption inhibitor obtained from the gel-like composition of the invention experiences no dripping even when coated to a vertical surface, allows an organoalkoxysilane to penetrate deeply into the surface of a porous material substrate, does not detract from the appearance, and imparts water absorption inhibitory properties to the substrate surface. The gel-like composition offers good workability for uniform coating. In addition, the gel-like composition may be of solventless form containing neither water nor organic solvent. The solventless gel-like composition releases no VOCs (volatile organic compounds) from organic solvents during coating operation. Thus, the gel-like composition is especially useful as a water absorption inhibitor for inorganic porous materials in building or civil engineering applications.

The invention claimed is:

1. A gel composition comprising:
   (A) 100 parts by weight of an organoalkoxysilane having the formula (1):

$$R^1_a Si(OR^2)_{4-a} \tag{1}$$

wherein $R^1$ is each independently a $C_1$-$C_{20}$ monovalent hydrocarbon group, $R^2$ is each independently a $C_1$-$C_8$ monovalent hydrocarbon group, and a is 1, 2, or 3, and/or a partial hydrolytic condensate of the organoalkoxysilane,
   (B) 0.3 to 20 parts by weight of an aluminum dicarboxylate having the formula (2):

$$(R^3COO)_2Al(OH) \tag{2}$$

wherein $R^3$ is each independently a $C_1$-$C_{25}$ monovalent hydrocarbon group,
   (C) 0.3 to 20 parts by weight of a $C_6$-$C_{24}$ fatty acid,
   (D) 0.01 to 10 parts by weight of a $C_6$-$C_{30}$ dicarboxylic acid, and
   (E) 0.01 to 10 parts by weight of an aluminum oligomer selected from aluminum oxide organoxides and aluminum oxide acylates and/or an aluminum alkoxide.

2. The composition of claim 1, further comprising (F) a polyorganosiloxane in which the number of dimethylsiloxane units is at least 20% relative to the total number of siloxane units, in an amount of 0.1 to 50 parts by weight per 100 parts by weight of component (A).

3. The composition of claim 2 wherein component (F) is a compound having the formula (4):

$$(R^6_3SiO_{0.5})_p(R^6_2SiO)_q(R^6SiO_{1.5})_r(SiO_2)_s \tag{4}$$

wherein $R^6$ is each independently hydrogen, hydroxyl, a substituted or unsubstituted $C_1$-$C_{10}$ monovalent hydrocarbon group which may contain an oxygen atom, or a $C_1$-$C_6$ alkoxy group, p, r, and s are integers of at least 0, q is an integer of at least 1, and the sum of p+q+r+s is such a number that the polyorganosiloxane may have a weight-average molecular weight of 500 to 5,000, with the proviso that the number of dimethylsiloxane units: $(CH_3)_2SiO$ is at least 20% relative to the total number of siloxane units represented by $R^6_m SiO_{(4-m)/2}$ wherein m is an integer of 0 to 3.

4. The composition of claim 1, which is free of water and organic solvent.

5. A water absorption inhibitor comprising the composition of claim 1.

6. A method of imparting water absorption inhibitory properties to a porous material, comprising coating the water absorption inhibitor of claim 5 to the surface of the porous material.

7. The method of claim 6 wherein the porous material is an inorganic porous material.

8. A porous material having a surface treated with the water absorption inhibitor of claim 5.

* * * * *